United States Patent

[11] 3,602,532

| [72] | Inventor | Hermann Ehrenberg<br>Langen, Germany |
|---|---|---|
| [21] | Appl. No. | 830,452 |
| [22] | Filed | June 4, 1969 |
| [45] | Patented | Aug. 31, 1971 |
| [73] | Assignee | Fouquet-Werk Frauz & Planck<br>Rottenburg, Neckar, Germany |
| [32] | Priority | June 21, 1968 |
| [33] | | Germany |
| [31] | | P 17 50 959.0 |

[54] PIPE UNION
6 Claims, 7 Drawing Figs.

[52] U.S. Cl. ............................................. 285/364,
277/236, 285/DIG. 18
[51] Int. Cl. ........................................ F16l 23/00
[50] Field of Search ............................... 285/363,
364, 365, 366, 367, 369, 349; 271/207, 236

[56] References Cited
UNITED STATES PATENTS
906,761 12/1908 White ........................... 277/236 X
2,841,429 7/1958 McCuistion ............. 285/DIG. 11 UX
3,012,802 12/1961 Waite ........................... 285/363 X
3,285,632 11/1966 Dunkle ........................ 285/363
3,323,805 6/1967 Legarra ...................... 277/236 X FOREIGN PATENTS
1,404,121 5/1965 France ......................... 285/367
653,981 5/1951 Great Britain ............... 285/365
273,494 5/1951 Switzerland ................. 285/364

Primary Examiner—Dave W. Arola
Attorney—Leon M. Strauss

ABSTRACT: The invention deals with a metal pipe union including a metal-sealing member for withstanding high pressures, vacuum, high temperatures and bending forces and consists primarily of two pipes having axially aligned end portions. Each pipe has at or near its end portion a radially directed flange and the flange of the pipe which is directly arranged at the end of one pipe has a projecting collar. Within this collar is arranged the metal packing ring, which is generally of Z-formation or cross section.

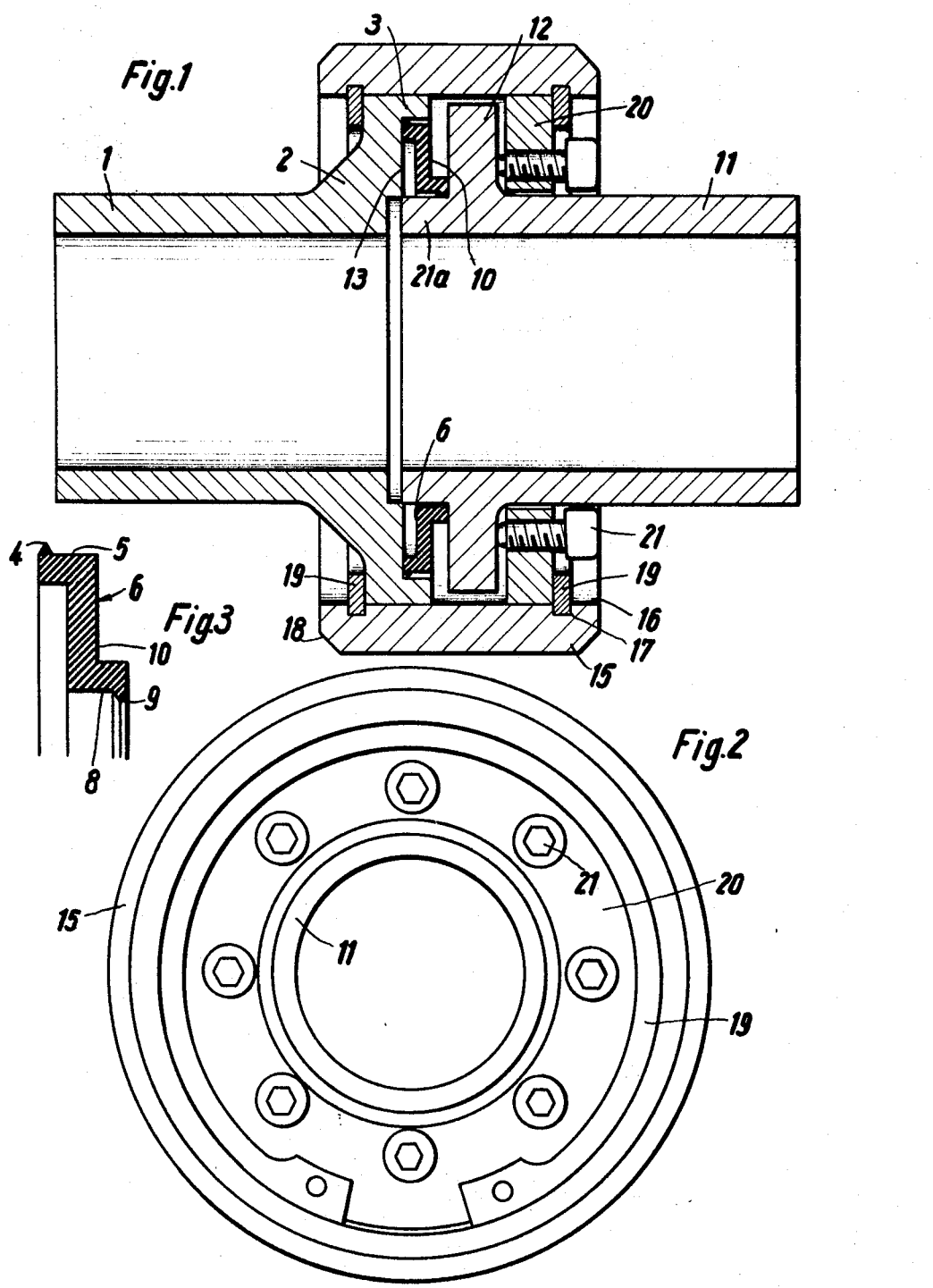

Inventor:
HERMANN EHRENBERG

Inventor:
HERMANN EHRENBERG

PIPE UNION

SUMMARY OF THE INVENTION

The present invention is directed to a pipe joint or union for use, in particular for high stresses resulting from extremely great pressures, vacuum conditions, and high temperatures and distinguishes from heretofore employed devices of such type in the provision of means establishing a special and efficient metal connection between pipe ends.

It is a principal object of the invention to provide means resulting in an efficacious sealing structure between pipe ends to be joined, which structure includes a preferably hard metal sealing element or elements having stays with tapered lugs radially projecting therefrom near or at the periphery, said sealing element or elements being also springy.

It is another object of the invention to provide means contributing to a greatly improved pipe union whose sealing element is carried out in a manner so that a tilting of the preferably Z-shaped sealing element around its projecting lugs results in their pressing into and penetrating the flange wall portions of the pipe joint.

Still a further object of the invention is to provide means structuring one pipe end with a specially shaped end flange and the other pipe end with a cylindrical flange set back relative to its pipe section appertaining thereto for receiving and supporting the respective lug edges of the sealing element.

According to the invention, an annular sleeve can be slid over the two pipe ends and retained in its place by means of snap rings. The annular sleeve can also be replaced by a divided clamping sleeve which is of U-type in cross section, the legs of which are gripping the pipe flanges therebetween. The clamping sleeve can also be formed as a three-part or multipart sleeve the parts of which are articulated to one another in a hinged way and which can be tightened by means of tightening screw means. Even in this case the clamping sleeve is of U-type and the sides of the pipe flanges with their faces remote from one another are advantageously formed to be leading and becoming effective in a direction relative to each other.

These and other objects and advantages of the invention ensue from the following detailed description, which has reference to the attached drawings, the latter being exemplary and explanatory of the principle of the invention and being in no way restrictive thereto.

BRIEF DESCRIPTION OF THE DRAWINGS

The invention will be explained on the basis of several embodiments of the invention as disclosed by the drawings.

In the drawings:

FIG. 1 is an axial section through a first embodiment pursuant to the invention.

FIG. 2 is a front view of FIG. 1 as seen from the right-hand end thereof.

FIG. 3 shows the sealing element on an enlarged scale and in cross section.

DETAILED DESCRIPTION OF THE INVENTION

Figure 4:
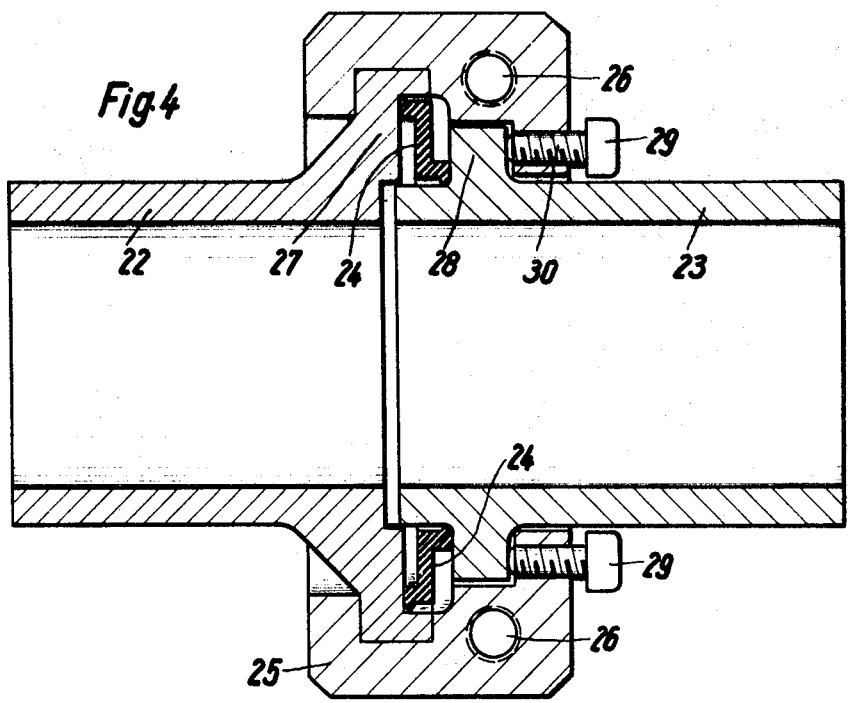
FIG. 4 is an axial section through a second embodiment pursuant to the invention.

According to the embodiment of FIGS. 1–3 the end 1 of the left-hand pipe section 2 comprises a Z-type flange 3 projecting to some extent on which an outer leg 5 of a Z-type sealing element 6 with a projecting outer lug 4 is located. The sealing element advantageously is made of the same material as the pipes to be connected. THe outer lug 4 projects beyond the end of outer leg 5 of sealing element 6. The latter is provided at the end of an inner leg 8 with an inner lug 9 being of same type and projecting inwardly. The projecting part of the Z-type flange 3 of the pipe end 2 is about coextensive with the length of the outer leg 5 and includes the wall thickness of stay 10 of sealing element 6. Hence stay 10 of sealing element 6 terminates in a common plane with that of the front wall of flange 3. The second pipe section 11 has a cylindrical flange 12 which is set back, approximately to the same extent and is approximately equal to and in accordance with the wall thickness of stay 10 of sealing element 6 and the length of outer leg 5 reduced by the thickness of stay 10 and the length of the inner leg 8 reduced by the thickness of stay 10. The outer and inner lugs 4 and 9 of the two legs are triangular in cross section, the tips of the two lugs being slightly set back relative to the front faces of the two legs 58.

THe passage of pipe section 2 is enlarged relative to the front face 13 of the Z-type flange 3 by the wall thickness of pipe section 1. The position of the parts described above corresponds to the basic position when the pipe union is not tightened.

According to the embodiment as shown, a sleeve 15 is applied onto the Z-type flange 3, said sleeve having at the inner diameter 16 two annular grooves 17, 18. Each of these annular grooves 17, 18 accommodates an open spring ring 19. The distance between the two annular grooves 17, 18 is of such size that it is possible to accommodate the two pipe flanges 3 and 12 between the two open spring rings 19 and also a clamping ring 20 located in front of flange 12 and comprising a plurality of screwbolts 21.

In order to adjust the above-described pipe union, the sealing element 6 is loosely inserted into the Z-type flange 3 of pipe section 1, so that the outer leg 5 of lug 4 is supported on the leg of flange 3 drawn forwardly. Then the other pipe section 11 is slid on, the inner lug 9 of sealing element 6 being in touch with leg 8. In this position of the two pipe sections 2 and 11, the sleeve 15 is moved onto the same, so that the two flanges 3 and 12 are covered and that the two annular grooves 17 and 18 are arranged outside the range of the two flanges 3 and 12. Subsequently the two open spring rings 19 and the clamping ring 20 are inserted into the two annular grooves 17 and 18, so that the clamping ring is covered still by one of the spring rings 19. The adjusting screws 21 are then evenly adjusted, so that the two pipe sections 1 and 11 are drawn relative to each other from the position shown in FIG. 1. By this action of the adjusting screws 21 the sealing element 6 is tilted around lugs 4 and 9 whereby stay 10 is also twisted, too.

Because of this resiliently flexible deformation of the sealing element 6, the tips of lugs 4 and 9 penetrate flange 3 or the pipe end 21a projecting inwardly, respectively, in which connection a complete sealing is achieved which even is effective at high pressures and high vacuum and which, satisfies all the requirements which the novel pipe union is exposed to. The novel pipe union is also nonleaking even if bending stresses possibly will occur.

Figure 5:
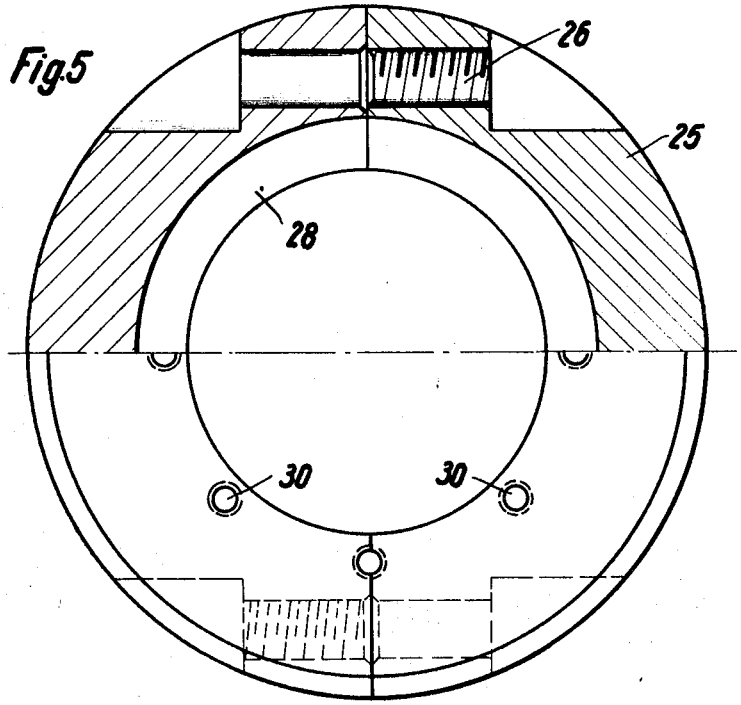
FIG. 5 is a cross section of FIG. 4, shown partly in section.

According to the alternative arrangement as seen in FIGS. 4 and 5 the ends of the two pipe section 22 and 23 have the same structure as the ends of pipe sections 1 and 11 according to FIGS. 1–3. The sealing element 24 also corresponds to the shape and function of sealing element 6 according to FIGS. 1 through 3. Sleeve 15 is replaced by a divided sleeve 25 which is retained together by means of two screw bolts 26 and which grips over flanges 27 and 28 of the two pipe sections 22 and 23. Sleeve 25 has an inner bore gripping over flange 27 and supporting against the outer side of flange 28. Adjusting bolts 29 having thread shanks 30 distributed around the periphery engage the edge of sleeve 25 covering flange 28. In this case, too, the transition of the pipe union from the basic position according to FIG. 4 into the sealing position is made by actuating the adjusting bolts 28 through canting action against the sealing element 24.

Figure 6:
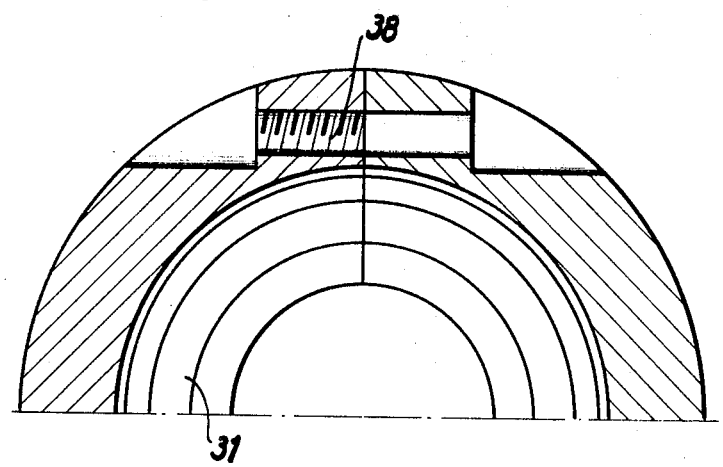
FIG. 6 is a fragmentary cross section through a third embodiment made in accordance with the invention.
Figure 7:
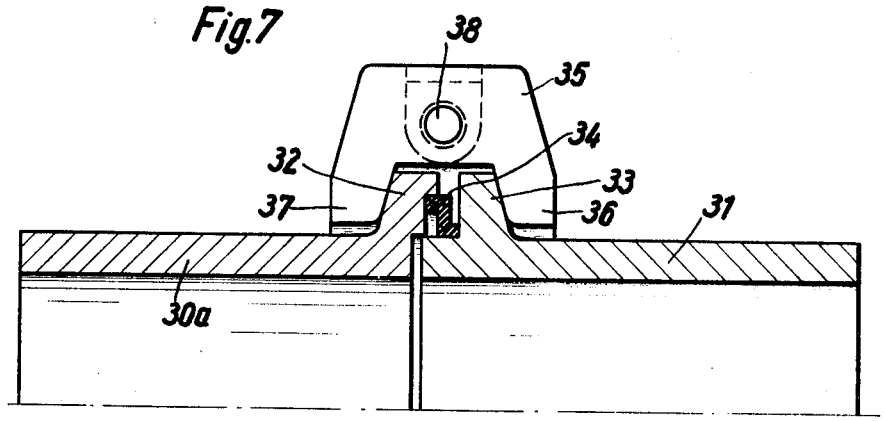
FIG. 7 is an axial section of FIG. 6.

FIGS. 6 and 7 illustrate a further alternative in which the ends of the two pipe sections 30a and 31 have the same structure as the pipe sections according to the last described embodiment. However, the sides of flanges 32 and 33, remote from each other are moving relative to one another. Sealing element 34 corresponds to that of the embodiment described before. A clamping sleeve 35 serves to connect the two pipe sections 30a and 31, said sleeve with the legs 36 and 37 projecting inwardly gripping over the two flanges 32 and 33. The clamping sleeve 35 can be adjusted by means of a screwbolt 38 and advantageously consists of three equal sections articulated to one another by transverse bolts. When adjusting the screwbolt 38, sleeve 35 is drawn onto the outer face of the two flanges 32 and 33 whereby the two pipe sections are drawn together and the sealing element is thereby canted. FIG. 6 illustrates the unadjusted basic position of these parts. Hence, in connection with this embodiment a special clamping ring 20 or 35, respectively, is then not required.

The novel pipe union is effectively tight even at high pressures and temperatures and also will be tight if bending stresses should possibly occur.

It is of course possible to modify and alter the structure of the pipe union within the scope of the appendent claims.

1. A pipe union for use in joining metal pipe ends to withstand especially high pressures and temperatures, characterized in that two pipe ends have spaced apart flanges provided with a sealing element of Z-formation inserted within the space between said flanges of the pipe ends to be connected to one another, each sealing element having a stay and two legs extending as inner and outer legs in axial direction of the pipe ends and being provided with radially projecting lugs at their outer and inner periphery, respectively, said lugs bearing against predetermined adjacent spaced apart portions of said flanges of said pipe ends, so that when said flanges are moved toward each other said sealing element will tilt around said lugs, thereby causing the lugs to seal against said predetermined portions of said flanges of said pipe ends, said sealing element consisting of the same metallic and resilient material as the material of the pipe ends to be connected.

2. A pipe union as claimed in claim 1, characterized in that the one pipe end comprises a Z-type flange at its joining end, the depth of the joining end approximately corresponding to the length of the outer leg of said sealing element, and that the other pipe end is provided with a flange set back relative to the other joining end, the extent of this setting back relative to the other pipe end approximately corresponding to the length of the outer leg, the wall thickness of the stay of the length of the inner leg of said sealing element.

3. A pipe union as claimed in claim 1, characterized in that said lugs are triangular in cross section, the tips of said lugs being set back relative to the frontal surfaces of the respective legs.

4. A pipe union as claimed in claim 1, characterized in that a cylindrical sleeve is located over the two pipe ends to be joined, said sleeve being provided with two annular inner grooves, each groove accommodating an open spring ring, said two spring rings extending beyond the ends of the two pipe flanges and having inner diameters less than the outer diameters of the flanges, a clamping ring located between one of said spring rings and one of said flanges and having an outer diameter greater than the inner diameter of said spring rings and an inner diameter less than the outer diameters of said flanges, and a plurality of axially directed adjusting bolts coacting with said one of said flanges and said clamping ring to move said flanges toward each other and being equally distributed over said clamping ring.

5. A pipe union as claimed in claim 1, characterized by a sleeve shaped for engagement with the outer opposed flanges of said two pipe end flanges.

6. A pipe union as claimed in claim 1, characterized in that the opposed faces of the two pipe end flanges are shaped for moving relative to each other and a clamping sleeve comprised of at least two parts encircling said pipe end flanges, each of said sleeve parts being provided with two converging inner annular flaps, the inclination of said flaps being conformed to the inclination of the outer pipe end flange sides, and screwbolts located in said sleeves for effectuating engagement of said sleeves via its flaps with said pipe end flange sides.